(12) United States Patent
Abbondanzio et al.

(10) Patent No.: US 9,838,378 B2
(45) Date of Patent: Dec. 5, 2017

(54) SECURING A SERVER BEFORE CONNECTING THE SERVER TO A DATA COMMUNICATIONS NETWORK

(71) Applicant: LENOVO ENTERPRISE SOLUTIONS (SINGAPORE) PTE. LTD., Singapore (SG)

(72) Inventors: Antonio Abbondanzio, Raleigh, NC (US); Gregory B. Pruett, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 27 days.

(21) Appl. No.: 14/809,814

(22) Filed: Jul. 27, 2015

(65) Prior Publication Data
US 2017/0034153 A1   Feb. 2, 2017

(51) Int. Cl.
*G06F 7/04* (2006.01)
*H04L 29/06* (2006.01)

(52) U.S. Cl.
CPC ...... *H04L 63/0823* (2013.01); *H04L 63/0492* (2013.01); *H04L 63/0876* (2013.01)

(58) Field of Classification Search
CPC .................................................. H04L 63/0823
USPC ............................................................ 726/6
See application file for complete search history.

(56) References Cited

U.S. PATENT DOCUMENTS

| | | | |
|---|---|---|---|
| 6,105,027 A * | 8/2000 | Schneider | H04L 63/0218 |
| 9,264,231 B2 * | 2/2016 | Dean | G06F 21/35 |
| 2006/0047960 A1 * | 3/2006 | Ono | H04L 9/0825 713/171 |
| 2009/0083400 A1 * | 3/2009 | Draca | H04L 29/12009 709/220 |
| 2014/0282048 A1 * | 9/2014 | Shapiro | G08B 25/14 715/741 |
| 2015/0326437 A1 * | 11/2015 | Shrestha | H04B 5/0025 709/222 |

* cited by examiner

*Primary Examiner* — Peter Shaw
(74) *Attorney, Agent, or Firm* — Brandon C. Kennedy; Jason A. Friday; Kennedy Lenart Spraggins LLP (57) ABSTRACT

Securing a server before connecting the server to a data communications network in a data center may include: establishing a proximity-based communications connection with a service processor of a server, where the server is not coupled to a data communications network; and transmitting, via the proximity-based data communications connection, a digital certificate to the service processor of the server, where the digital certificate is configured to enable access to the server only by a system management server.

14 Claims, 5 Drawing Sheets

SECURING A SERVER BEFORE CONNECTING THE SERVER TO A DATA COMMUNICATIONS NETWORK

BACKGROUND OF THE INVENTION

Field of the Invention

The field of the invention is data processing, or, more specifically, methods, apparatus, and products for securing a server of a data center before connecting the server to a data communications network.

Description of Related Art

Security is increasingly becoming a primary concern for information technology ('IT') departments of enterprise-level companies as well as for smaller establishments. Centralized control of server deployments in a data center generally requires systems management techniques. Such techniques, however, require careful security planning IT personnel must ensure that newly provisioned servers in a data center cannot be managed by a 'rogue' management server. Because service processor of such servers may ship from the manufacturer with a known, default user account and password, special care must be taken to ensure that the first login to such a server is from a trusted systems management server. The service processors must be secured at the time of installation, before connecting the server to a network with the data center and certainly before the server is able to access the Internet. If not, the server is exposed to the possibility of a rogue software discovering the server, utilizing the default account and password settings to log in to the server, and taking control of the server. To carry out such securing of a server today requires an IT personnel member to utilize laptop to directly connect (typically a crossover CAT-5 cable for direct connection to the server) to configure each server, one by one, changing the account settings and password. Only then is the server connected to any wide area networks. Such direct connection coupled with a login is cumbersome and time consuming.

SUMMARY OF THE INVENTION

Methods, apparatus, and products for securing a server in a data center before connecting the server to a data communications network are disclosed in this specification. Such securing includes: establishing a proximity-based communications connection with a service processor of a server, said server not coupled to a data communications network; and transmitting, via the proximity-based data communications connection, a digital certificate to the service processor of the server, said digital certificate configured to enable access to the server only by a system management server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
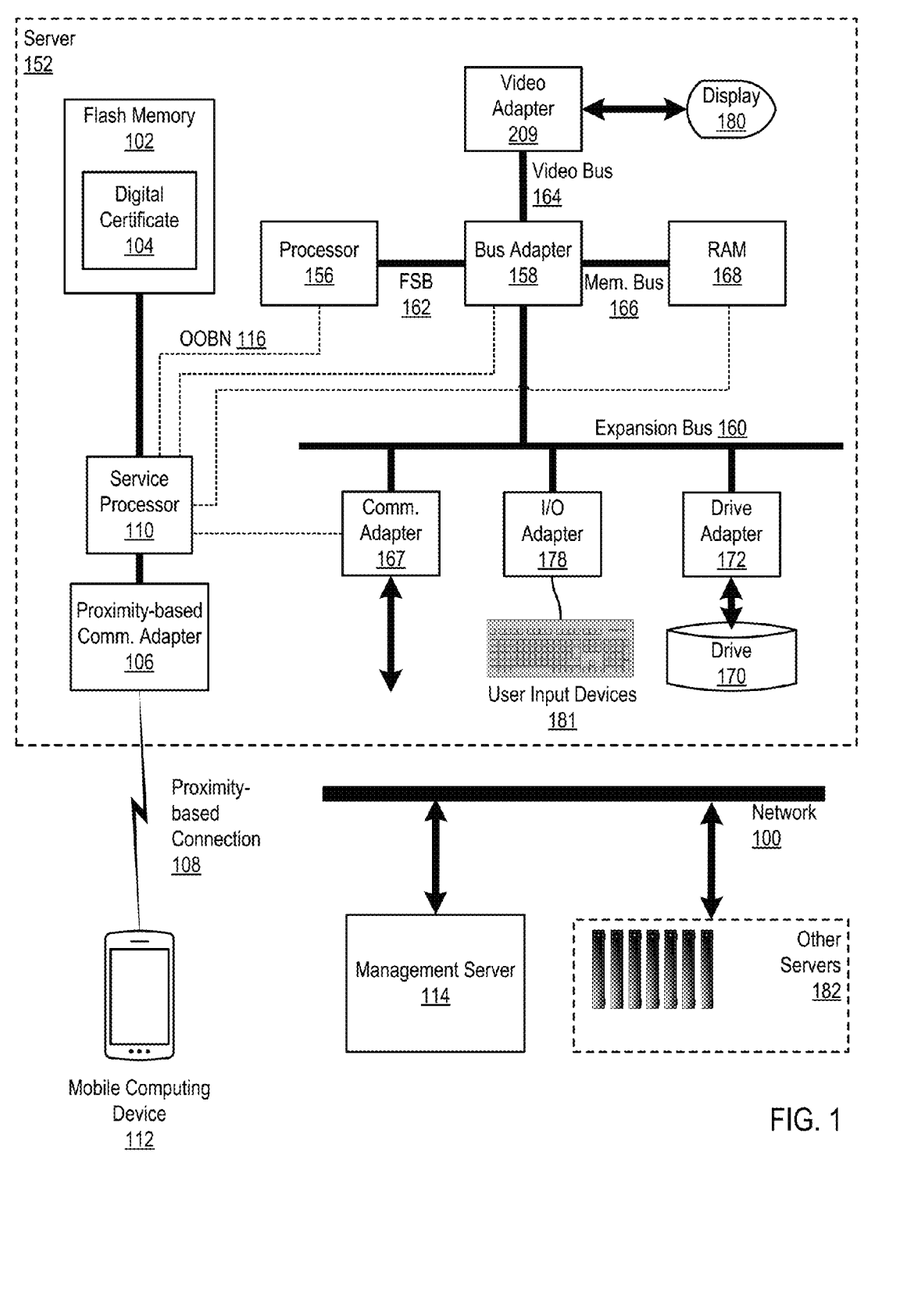
FIG. 1 sets forth a block diagram of an example system for securing a server of a data center before connecting the server to a data communications network according to embodiments of the present invention.

Exemplary methods, apparatus, and products for securing a server of a data center before connecting the server to a data communications network in accordance with the present invention are described with reference to the accompanying drawings, beginning with FIG. 1. FIG. 1 sets forth a block diagram of an example system for securing a server of a data center before connecting the server to a data communications network according to embodiments of the present invention. The system of FIG. 1 includes several computing devices including a server (152), a mobile computing device (112), a management server (114) and other servers (182). For clarity, components of the server (152) are called out in detail. Readers of skill in the art will recognize that each of the computing devices may include similar components that operate in similar manners as the components of the server (152).

The exemplary server (152) configured for securing a server of a data center before connecting the server to a data communications network according to embodiments of the present invention. The server (152) of FIG. 1 includes at least one computer processor (156) or 'CPU' as well as random access memory (168) ('RAM') which is connected through a high speed memory bus (166) and bus adapter (158) to processor (156) and to other components of the server (152).

The server (152) of FIG. 1 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in computing devices configured for securing a server of a data center before connecting the server to a data communications network according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary server (152) of FIG. 1 includes a communications adapter (167) for data communications with other servers (182) and for data communications with a data communications network (100). In the example of FIG. 1, the communications adapter is not coupled to the local area network (100) which may include a local area network or a wide area network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computing device sends data communications to another computing device, directly or through a data communications network. Examples of communications adapters useful in computing devices configured for securing a server of a data center before connecting the server to a data communications network according to embodiments of the present invention include modems for wired dial-up communications, Ethernet (IEEE 802.3) adapters for wired data communications, and 802.11 adapters for wireless data communications.

The exemplary server (152) of FIG. 1 also includes a service processor (110). A service processor (110) is a separate, dedicated internal processor typically located on the motherboard of a server, a PCI card, or on the chassis of a blade server or telecommunications platform. The service processor operates independently from the server's CPU and operating system (OS), even if the CPU or OS is locked up or otherwise inaccessible. The service processor may monitor operation of various hardware, software, and firmware resources within the computing system (152) through an out-of-band bus (116). The service processor (110) may report such monitoring to a system management server (114). The service processor may be coupled to a different power source than other components of the server (152) so that the service processor may operate even when the main components of the server (152) are powered down.

The service processor (110) in the example of FIG. 1 is coupled to a proximity-based communications adapter (106). The proximity-based communications adapter (106) may also be coupled to a power source other than the primary power source of the main components of the computing system. In some embodiments, the proximity-based communications adapter may be coupled to the same power source as the service processor. In some embodiments, the proximity-based communications adapter (106) may be coupled to no power source at all. Instead, devices that establish a communications connection with the device may provide that power wirelessly.

The proximity-based communications adapter (106) is a communications adapter configured for wireless communications with another device typically in a point-to-point manner. The adapter is called 'proximity-based' because the wireless communications connection between the adapter and another device is only activated when that device is no less than a predefined distance from the adapter. In some embodiments, for example, the proximity-based communications adapter (106) may be implemented as a near-field communications tag. Near field communication ('NFC') is the set of protocols that enables smartphones and other devices to establish radio communication with each other by touching the devices together or bringing them into proximity to a distance of typically 10 cm (3.9 in) or less. An NFC tag typically contains data (between 96 and 4,096 bytes of memory, for example). Such NFC tags may be read-only or may be rewritable.

In other embodiments, the proximity-based communications adapter (106) may be implemented as a Bluetooth™ Low Energy (LE') device. Bluetooth LE devices enable a wireless personal area network to be established with one or more other Bluetooth LE devices. The term 'wireless personal area network' as the term is used here refers to a wireless network, operating on the IEEE 802.15 standard protocols, and typically only encompassing a very small area. The range of a wireless personal area network established utilizing Bluetooth LE devices may be configurable to be very small, less than 10 inches in some embodiments.

Other types of proximity-based communications adapters (106) may include infrared transceivers, ultrasonic transceivers, radio frequency identifier (RFID) transceivers and the like. Readers of skill in the art will recognize that any communications adapter that supports a predefined range of wireless communications, typically a very small area relative to most wireless standards, may be implemented as a proximity-based communications adapter (106) in accordance with embodiments of the present disclosure.

Also included in the example of FIG. 1, is a mobile computing device (112). A mobile computing device may be any computing system which is mobile: a mobile telephone, a handheld mobile device, a laptop, and the like. The mobile computing device (112) in the example of FIG. 1 may include many similar components as those depicted in the example server (152).

The mobile computing device (112), for example, may include RAM in which is stored a certificate installation program. The certificate installation program may be a module of computer program instructions that, when executed by a processor of the mobile communications device (112), establishes a proximity-based communications connection (108) with the service processor (112) of the server (152). As mentioned above, the server (152) is not coupled to the data communications network (100). At the time the mobile computing device (112) establishes the proximity-based communications connection (108), the server (152) is not capable of receiving any data communications from any other source.

Establishing a proximity-based communications connection when the adapter (106) of the server is an NFC tag may be carried out by the mobile computing device becoming physically close to the server. In fact, in some embodiments, the mobile computing device may establish the proximity-based communications connection only upon the mobile computing device touching a particular physical location of the server, called the 'NFC sweet spot.'

After establishing the proximity-based connection (108), the certificate installation program (112) may transmit, via the proximity-based data communications connection (108), a digital certificate (104) to the service processor (110) of the server. A digital certificate certifies the ownership of a public key by the named subject of the certificate. This allows others (relying parties) to rely upon signatures or on assertions made by the private key that corresponds to the certified public key. The digital certificate (104) is configured to enable access to the server (152) only by a system management server (114). That is, the digital certificate (104) includes the public key of the system management server. The certificate installation program (112) may transmit the digital certificate (104) to the service processor in various ways. In embodiments in which the proximity-based communications adapter (106) is an NFC tag, for example, the certificate installation program may transmit a digital certificate to the service processor by re-writing the contents of memory of the NFC and the service processor periodically polling that memory for changes. Once the service processor (110) discovers a change in the memory, the service processor may be configured to retrieve the digital certificate from the NFC tag's memory and store the digital certificate in flash memory (102) of the server or in other non-volatile memory of the server. In some embodiments, for example, the service processor (110) may be configured to store the digital certificate in registers or other memory of the primary communications adapter (167) of the server (152).

In some embodiments, the service processor may not retrieve the digital certificate until communication is attempted with the service processor itself through the out-of-band network. That is, when the server (152) is coupled to a network, the server may be coupled to two distinct networks: a local area/wide area network (100), and an out-of-band network that couples the service processor to the system management server (114). Rather than securing all communications with the server (152) through the digital certificate, the service processor may only secure communications directed to the service processor itself by utilizing the digital certificate.

Consider the following example. A systems management server provides a digital certificate to a certificate installation program executing on an IT personnel member's smartphone. A rack is filled with servers by sliding each server into an empty rack unit. Prior to coupling the servers to the data communications network of the data center with a physical cable (such as an Ethernet, Fibre Channel, RS232, RS458 or other cable) and before powering on each server, an IT personnel member, beginning with the server in the most elevated position, moves the smartphone to a physical location near the NFC tag of each server (known as an "NFC sweet spot"). Consider also that the NFC sweet spot on each server is located in the same position, the lower left hand corner of the front bezel. When the NFC adapter of the smartphone detects the NFC tag of the server at the most elevated position, the NFC adapter executes the certificate installation program which causes the NFC adapter to rewrite the contents of the NFC tag with the digital certificate. The IT personnel member repeats the process, moving down in the rack for each of the servers installed in the rack.

The service processor of each server retrieves the digital certificate from the NFC tag and stores the digital certificate in non-volatile memory of the primary communications adapter of the server. When the servers are coupled to the data communications network of the data center and powered on, the communications adapter is configured already configured with the digital certificate such that only the management server may communicate with the server. In another example, each service processor does not retrieve the digital certificate, the servers are coupled to an in-band network while the service processors are coupled to system management server through an out-of-band network. In such an example, communications with the service processor (110) are restricted by the digital certificate (104) to those communications originating from the system management server (114). All in-band communications through the in-band data communications network (100) may be secured or unsecured.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
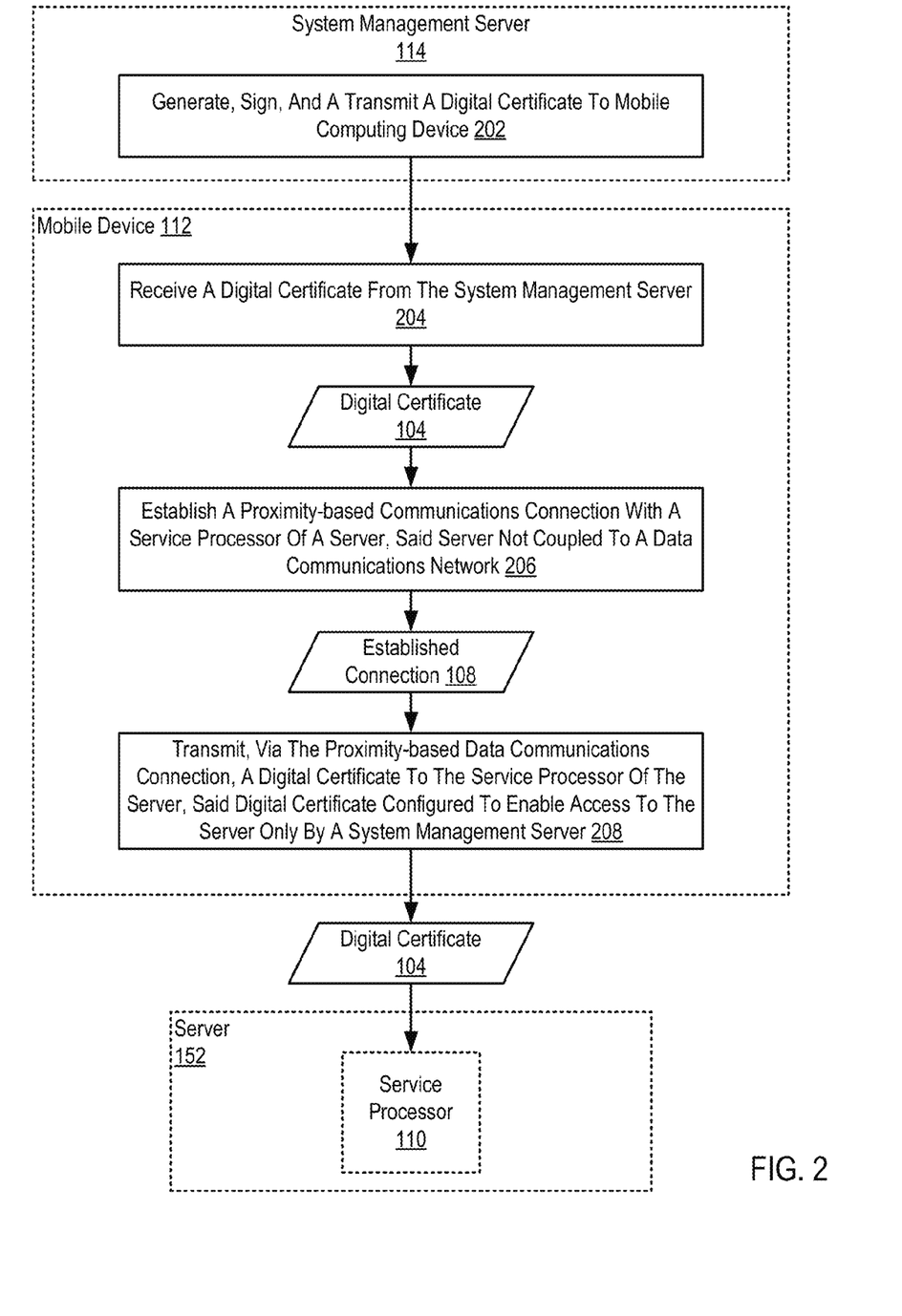
FIG. 2 sets forth a flow chart illustrating an exemplary method for securing a server of a data center before connecting the server to a data communications network according to embodiments of the present invention.

For further explanation, FIG. 2 sets forth a flow chart illustrating an exemplary method for securing a server of a data center before connecting the server to a data communications network according to embodiments of the present invention. The method of FIG. 2 includes a system management server (152) generating, signing, and transmitting a digital certificate (104) to a mobile computing device (112). The method of FIG. 2 also includes receiving (204) the digital certificate (104) from the system management server (152). The transmission and receipt of the digital certificate may be carried out in various ways including through in-band data communications over a local area network.

The method of FIG. 2 also includes establishing (206) a proximity-based communications connection with a service processor (110) of a server (152). The server (152) at the time of establishing a proximity-based communications connection is not coupled to a data communications network. Establishing (206) a proximity-based communications connection may be carried out in various ways in accordance with various protocols. Generally, establishing any type of proximity-based communications connection includes the mobile communications device coming into a close physical proximity to the server (152). In embodiments in which the mobile communications device is implemented with an NFC adapter and the server (152) is implemented with an NFC tag, the mobile communications device may establish a connection by being physically located near the NFC, in some cases actually in contact with the housing of the server. In embodiments in which the mobile communications device (112) and the server (152) includes a Bluetooth LE adapter, the mobile communications device (112) may establish a proximity-based communications connection by the device moving physically near the server, and the Bluetooth LE adapters performing a handshake routine to establish a point-to-point communications connection.

The method of FIG. 2 also includes transmitting (208), via the proximity-based data communications connection, the digital certificate to the service processor (110) of the server. The digital certificate is configured to enable access the server only by a system management server. As mentioned above, transmitting (208) the digital certificate (104) to the service processor (110) may be carried out in various ways. In embodiments in which the server (152) includes an NFC tag, the mobile communications device may rewrite the tag with the digital certificate. The service processor may be configured to then utilize the digital certificate in the NFC tag when determining whether to grant access to an entity requesting access.

Figure 3:
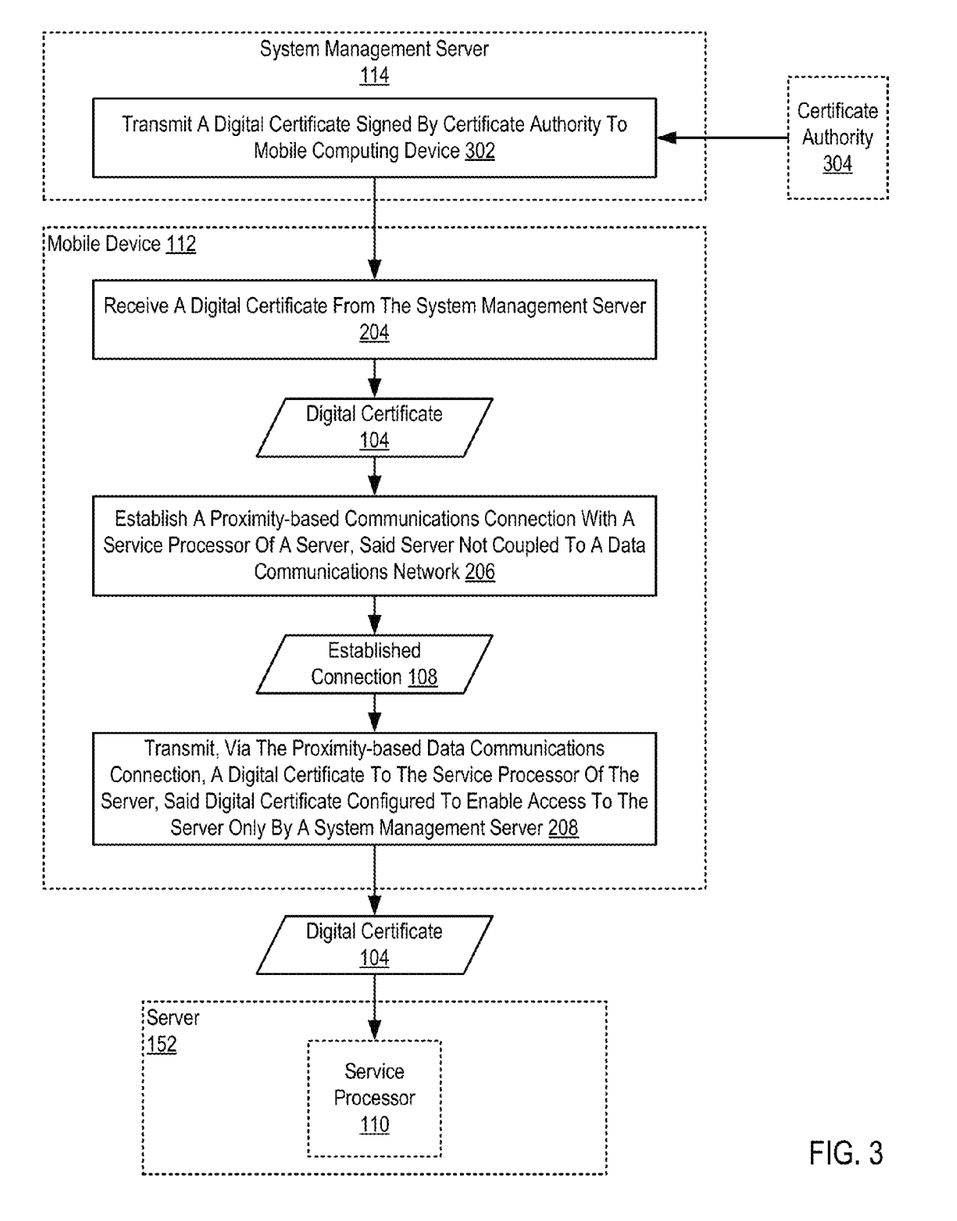
FIG. 3 sets forth a flow chart illustrating a further exemplary method for securing a server of a data center before connecting the server to a data communications network according to embodiments of the present invention.

For further explanation, FIG. 3 sets forth a flow chart illustrating a further exemplary method for securing a server of a data center before connecting the server to a data communications network according to embodiments of the present invention. The method of FIG. 3 is similar to the method of FIG. 2 in that the method of FIG. 3 also includes: establishing (206) a proximity-based communications connection with a service processor (110) of a server (152), where the server is not coupled to a data communications network; and transmitting (208), via the proximity-based data communications connection, a digital certificate (104) to the service processor of the server, where the digital certificate is configured to enable access to the server only by a system management server.

The method of FIG. 3 differs from the method of FIG. 2, however, in that the method of FIG. 3 includes transmitting, by the system management server (114) to the mobile device (112), a digital certificate signed by a certificate authority ('CA') (304) and receiving (112), by the mobile device, the digital certificate (104) from the system management server, wherein the certificate is digitally signed by a certificate authority. That is, in contrast to the method of FIG. 2 in which the digital certificate is signed by the system management server itself, the digital certificate in the example of FIG. 3 is signed by a CA. A CA as the term is used here is a trusted third party that issues digital certificates. The CA is trusted both by the subject (owner) of the certificate, in this example the system management server, and by the party relying upon the certificate, in this case the server (152) or service processor (110).

Figure 4:
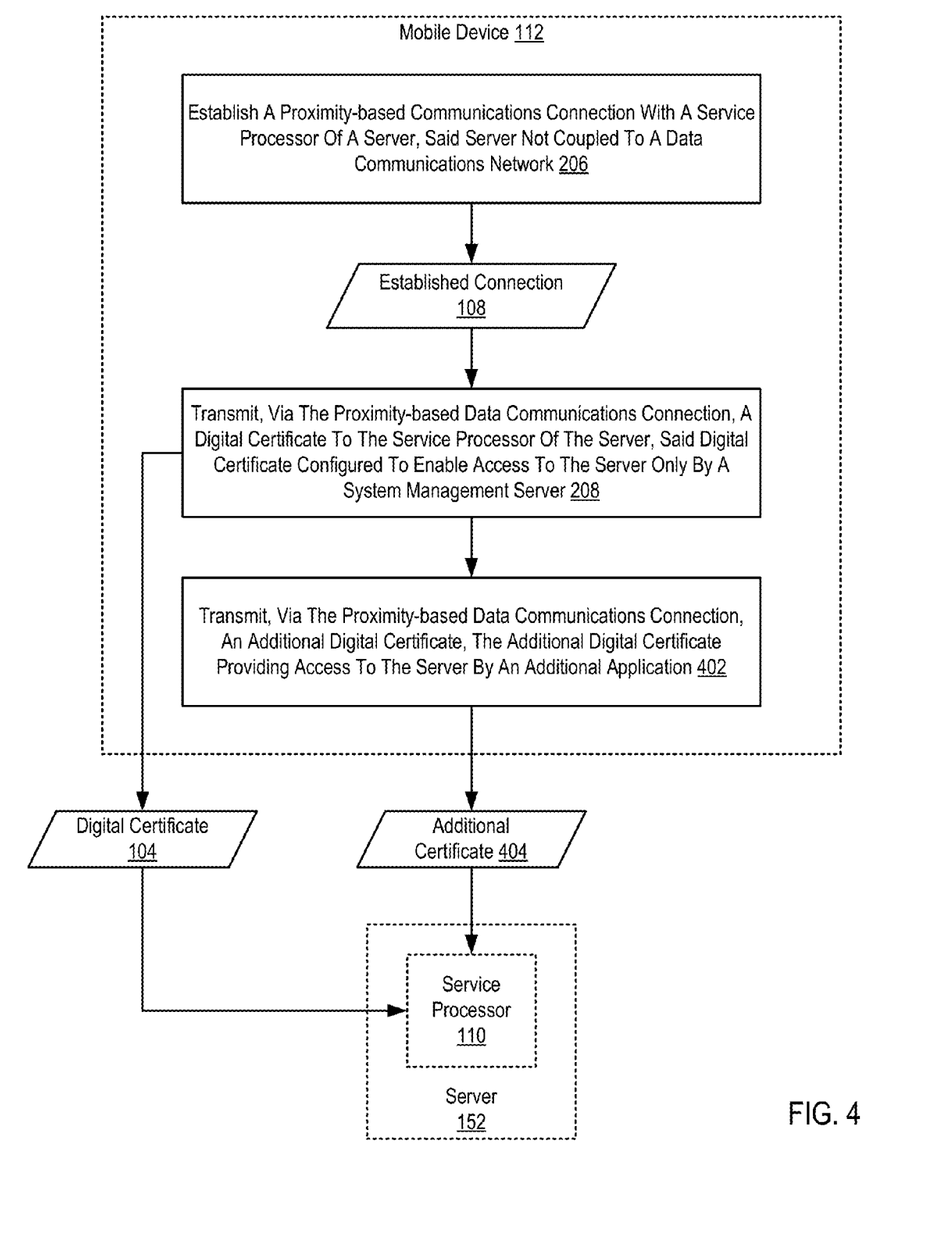
FIG. 4 sets forth a flow chart illustrating a further exemplary method for securing a server of a data center before connecting the server to a data communications network according to embodiments of the present invention.

For further explanation, FIG. 4 sets forth a flow chart illustrating a further exemplary method for securing a server of a data center before connecting the server to a data communications network according to embodiments of the present invention. The method of FIG. 4 is similar to the method of FIG. 2 in that the method of FIG. 4 also includes: establishing (206) a proximity-based communications connection with a service processor (110) of a server (152), where the server is not coupled to a data communications network; and transmitting (208), via the proximity-based data communications connection, a digital certificate (104) to the service processor of the server, where the digital certificate is configured to enable access to the server only by a system management server.

The method of FIG. 4 differs from the method of FIG. 2, however, in that the method of FIG. 4 also includes transmitting (402), via the proximity-based data communications connection, an additional digital certificate (404) to the service processor (110). The additional certificate (404) in the example of FIG. 4 may provide access to the server by an additional application. In this way, prior to ever being coupled to a data communications network, the server may be effectively secured such that the server is only able to accept communications from the system management server and applications for which the server (152) has received an additional digital certificate. For example, the mobile communications device may provide a digital certificate that includes the public key of a particular secure web browser or database management application or the like.

Figure 5:
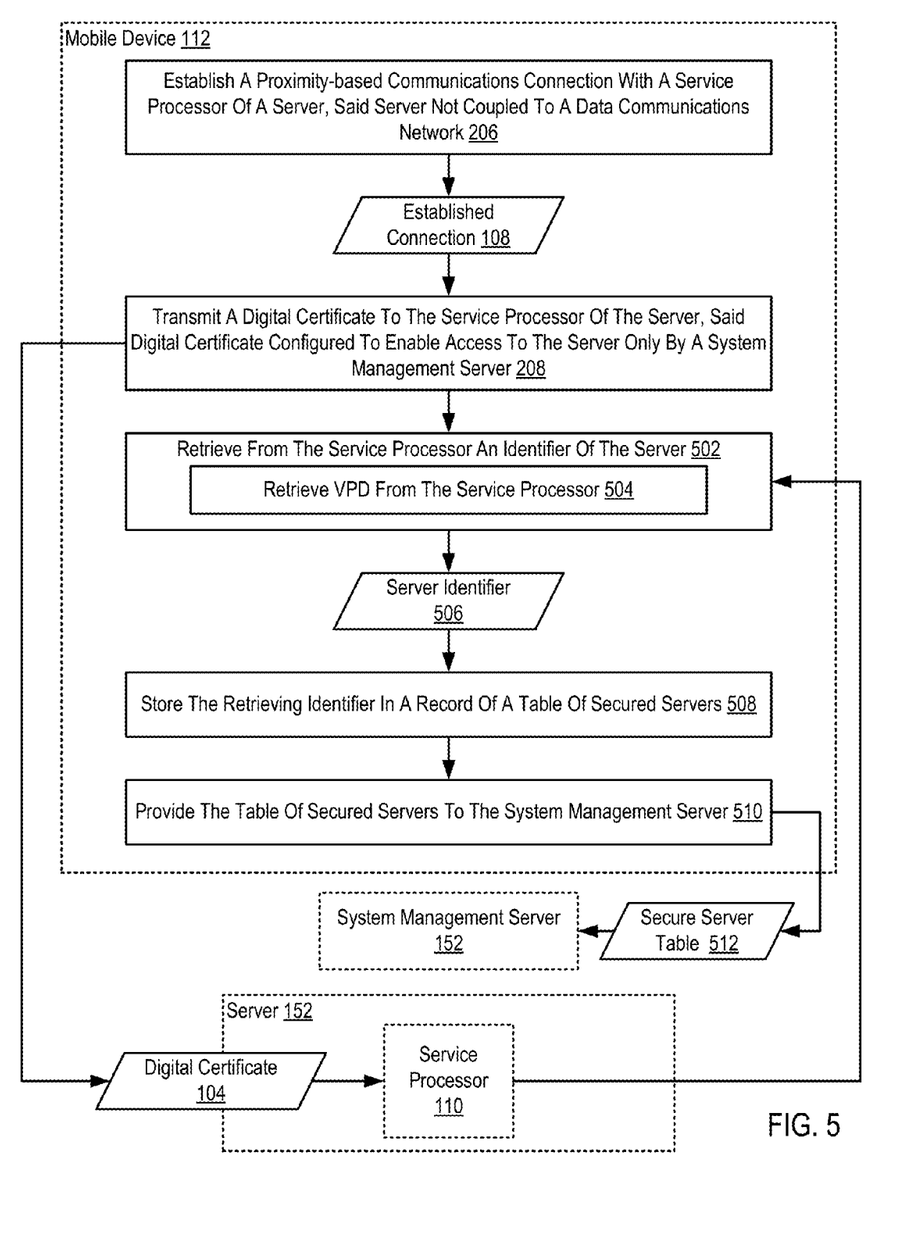
FIG. 5 sets forth a flow chart illustrating a further exemplary method for securing a server of a data center before connecting the server to a data communications network according to embodiments of the present invention.

For further explanation, FIG. 5 sets forth a flow chart illustrating a further exemplary method for securing a server of a data center before connecting the server to a data communications network according to embodiments of the present invention. The method of FIG. 5 is similar to the method of FIG. 2 in that the method of FIG. 5 also includes: establishing (206) a proximity-based communications connection with a service processor (110) of a server (152), where the server is not coupled to a data communications network; and transmitting (208), via the proximity-based data communications connection, a digital certificate (104) to the service processor of the server, where the digital certificate is configured to enable access to the server only by a system management server.

The method of FIG. 5 differs from the method of FIG. 2, however, in that the method of FIG. 5 also includes retrieving (502) from the service processor (110) an identifier (506) of the server. In the example of FIG. 5, retrieving (502) from the service processor (110) an identifier (506) of the server may be carried out by retrieving vital product data ('VPD') from the server. VPD as the term is used here is a collection of configuration and informational data associated with a particular set of hardware or software. VPD includes information such as part numbers, serial numbers, media access control (MAC) addresses, and engineering change levels. VPD data may be burned onto EEPROMs associated with various hardware components, or can be queried through attached Inter-integrated Circuit (I2C) buses. VPD is sometimes utilized by firmware to determine the nature of the system hardware and to shield the operation of the firmware from minor changes and variations of hardware implementations within a given machine model number.

The method of FIG. 5 also includes storing (508) the retrieved identifier in a record of a table (512) of secured servers and providing (510) the table (512) of secured servers to the system management server (152). In this way, the mobile communications device may install the system management server's digital certificate (104) in many groups of servers, all the while tracking identifiers for each of the servers in a single table. Then, the mobile communications device can report the installation progress by providing the system management server the table of servers on which the digital certificate has been installed (the 'secure server' table).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by first program instructions on a mobile computing device:
    establishing a proximity-based communications connection with a service processor of a server via a near field communication (NFC) tag of the server, said server not coupled to a data communications network other than the proximity-based communications connection;
    transmitting, via the proximity-based data communications connection, a digital certificate to the NFC tag of the server, said digital certificate configured to restrict access to the server to a particular system management server;
    retrieving from the service processor an identifier of the server, including retrieving vital product data (VPD);
    storing the retrieved identifier in a record of a table of secured servers; and
    providing the table of secured servers to the particular system management server.

2. The method of claim 1 further comprising:
    receiving the digital certificate from the particular system management server, wherein the digital certificate is digitally signed by the particular system management server.

3. The method of claim 1 further comprising:
    receiving the digital certificate from the particular system management server, wherein the certificate is digitally signed by a certificate authority.

4. The method of claim 1 further comprising:
    transmitting, via the proximity-based data communications connection, an additional digital certificate, said additional digital certificate providing access to the server by an additional application.

5. An apparatus comprising:
a computer processor;
a proximity-based communications adapter; and
computer memory operatively coupled to the computer processor, the computer memory having disposed within it computer program instructions that, when executed by the computer processor, cause the apparatus to carry out the steps of:
establishing, via the proximity-based communications adapter, a proximity-based communications connection with a service processor of a server via a near field communication (NFC) tag of the server, said server not coupled to a data communications network other than the proximity-based communications connection;
transmitting, via the proximity-based data communications connection, a digital certificate to the NFC tag of the server, said digital certificate configured to restrict access to the server to a particular system management server;
retrieving from the service processor an identifier of the server, including retrieving vital product data (VPD);
storing the retrieved identifier in a record of a table of secured servers; and
providing the table of secured servers to the particular system management server.

6. The apparatus of claim 5 further comprising computer program instructions that, when executed by the computer processor, cause the apparatus to carry out the steps of:
receiving the digital certificate from the particular system management server, wherein the digital certificate is digitally signed by the particular system management server.

7. The apparatus of claim 5 further comprising computer program instructions that, when executed by the computer processor, cause the apparatus to carry out the steps of:
receiving the digital certificate from the particular system management server, wherein the certificate is digitally signed by a certificate authority.

8. The apparatus of claim 5 further comprising computer program instructions that, when executed by the computer processor, cause the apparatus to carry out the steps of:
transmitting, via the proximity-based data communications connection, an additional digital certificate, said additional digital certificate providing access to the server by an additional application.

9. The apparatus of claim 5 wherein the apparatus further comprises a mobile computing device.

10. A computer program product disposed upon a computer readable medium, the computer program product comprising computer program instructions that, when executed, cause a computer to carry out the steps of:
establishing a proximity-based communications connection with a service processor of a server via a near field communication (NFC) tag of the server, said server not coupled to a data communications network other than the proximity-based communications connection;
transmitting, via the proximity-based data communications connection, a digital certificate to the NFC tag of the server, said digital certificate configured to restrict access to the server to a particular system management server;
retrieving from the service processor an identifier of the server, including retrieving vital product data (VPD);
storing the retrieved identifier in a record of a table of secured servers; and
providing the table of secured servers to the particular system management server.

11. The computer program product of claim 10 further comprising computer program instructions that, when executed, cause the computer to carry out the steps of:
receiving the digital certificate from the particular system management server, wherein the digital certificate is digitally signed by the particular system management server.

12. The computer program product of claim 10 further comprising computer program instructions that, when executed, cause the computer to carry out the steps of:
receiving the digital certificate from the particular system management server, wherein the certificate is digitally signed by a certificate authority.

13. The computer program product of claim 10 further comprising computer program instructions that, when executed, cause the computer to carry out the steps of:
transmitting, via the proximity-based data communications connection, an additional digital certificate, said additional digital certificate providing access to the server by an additional application.

14. The computer program product of claim 10 wherein the computer further comprises a mobile computing device.

* * * * *